(12) United States Patent
Hasenour et al.

(10) Patent No.: US 10,182,528 B2
(45) Date of Patent: Jan. 22, 2019

(54) DRAPER BELT ASSEMBLY

(71) Applicant: Deere and Company, Moline, IL (US)

(72) Inventors: Anthony M. Hasenour, Port Byron, IL (US); Alexander B. Lassers, Davenport, IA (US); William P. Conrad, Bettendorf, IA (US); Joshua R. Pierson, Davenport, IA (US); Volnei Cristiano Gerhardt, Horizontina (BR)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 15/494,481

(22) Filed: Apr. 22, 2017

(65) Prior Publication Data

US 2018/0303034 A1  Oct. 25, 2018

(51) Int. Cl.
*A01D 61/00* (2006.01)
*A01D 61/02* (2006.01)

(52) U.S. Cl.
CPC ........... *A01D 61/006* (2013.01); *A01D 61/02* (2013.01)

(58) Field of Classification Search
CPC ...... A01D 57/20; A01D 61/002; A01D 41/14; A01D 61/02; A01D 43/06; A01D 61/006; A01D 57/06; A01F 15/18; A01F 2015/183; A01F 2015/186; B65G 15/30
See application file for complete search history.

(56) References Cited

U.S. PATENT DOCUMENTS

| 3,880,274 | A | * | 4/1975 | Bechtloff | ............... | B65G 15/14 |
| | | | | | | 198/604 |
| 4,011,939 | A | | 3/1977 | Conrad | | |
| 4,225,036 | A | * | 9/1980 | Michael | ............... | B65G 15/46 |
| | | | | | | 198/840 |

(Continued)

FOREIGN PATENT DOCUMENTS

| CA | 2708744 | 12/2011 |
| CN | 106044101 | 10/2016 |

(Continued)

OTHER PUBLICATIONS

Michael A. Hosch, "V-Guided Belts a Much Better Option for Keeping Converyor Belts Centered Than Crowned Rollers", http://beta.machinedesign.com/mechanical-drives/v-guided-conveyor-belts-much-better-option-keeping-conveyor-belts-centered-crowned?utm_test=redirect&utm_referrer= (Oct. 7, 2010).

(Continued)

*Primary Examiner* — Arpad Fabian-Kovacs
(74) *Attorney, Agent, or Firm* — Rathe Lindenbaum LLP

(57) ABSTRACT

A draper belt assembly may include a roller and a web. The roller may include a first groove having a first interior side surface facing in a first direction and a second groove having a second interior side surface facing in the first direction. The draper belt may include a web, and first and second elastomeric belt guides received within the first groove and the second groove, respectively. The first belt guide may have a first exterior side surface facing in a second direction opposite the first direction and axially spaced from the first (Continued)

interior side surface by first distance. The second belt guide may have a second exterior side surface facing in the second direction, axially spaced from the second interior side surface by second distance greater than the first distance in absence of axial loads to the draper belt.

20 Claims, 8 Drawing Sheets

(56) References Cited

U.S. PATENT DOCUMENTS

| | | | | |
|---|---|---|---|---|
| 4,601,685 | A * | 7/1986 | Delhaes | B65G 15/46 198/840 |
| 5,017,969 | A * | 5/1991 | Mitomi | G03G 15/0131 198/835 |
| 5,369,477 | A | 11/1994 | Foote | |
| 5,768,986 | A * | 6/1998 | Arnold | A01F 15/18 100/88 |
| 5,822,959 | A | 10/1998 | Norton | |
| 6,109,427 | A | 8/2000 | Hosch et al. | |
| 6,152,282 | A * | 11/2000 | Ewan | B07C 5/36 198/382 |
| 6,351,931 | B1 | 3/2002 | Shearer | |
| 7,640,720 | B1 | 1/2010 | Lovett et al. | |
| 7,661,667 | B2 * | 2/2010 | Tsutsui | B65H 5/026 198/834 |
| 7,862,879 | B2 * | 1/2011 | Levine | D21F 1/0027 162/358.4 |
| 8,065,865 | B1 * | 11/2011 | Dow | A01D 57/20 56/181 |
| 8,291,686 | B1 | 10/2012 | Cormier | |
| 8,573,388 | B2 * | 11/2013 | Hoffman | A01D 41/14 198/814 |
| 8,579,774 | B2 * | 11/2013 | Derscheid | A01F 15/18 198/835 |
| 9,096,376 | B1 | 8/2015 | Wood et al. | |
| 9,622,412 | B2 * | 4/2017 | Hasenour | A01D 57/20 |
| 9,901,035 | B2 * | 2/2018 | Ryz | A01F 15/18 |
| 2005/0022491 | A1 * | 2/2005 | Zurn | A01D 57/20 56/16.4 R |
| 2005/0082147 | A1 * | 4/2005 | Mol | B29C 47/0038 198/834 |
| 2007/0193243 | A1 * | 8/2007 | Schmidt | A01D 41/14 56/181 |
| 2008/0092508 | A1 * | 4/2008 | Talbot | A01D 57/20 56/181 |
| 2008/0276591 | A1 * | 11/2008 | Tippery | A01D 57/06 56/181 |
| 2009/0308042 | A1 * | 12/2009 | Lovett | A01D 57/20 56/153 |
| 2010/0313540 | A1 * | 12/2010 | Sauerwein | A01D 41/14 56/181 |
| 2011/0315524 | A1 * | 12/2011 | Kidd | A01D 61/02 198/837 |
| 2012/0042617 | A1 * | 2/2012 | Dow | A01D 61/002 56/14.5 |
| 2012/0233974 | A1 * | 9/2012 | Cormier | A01D 57/20 56/181 |
| 2015/0075130 | A1 * | 3/2015 | Ryz | A01F 15/18 56/341 |
| 2015/0291366 | A1 * | 10/2015 | Cumberlege | B65G 39/071 198/806 |
| 2016/0096685 | A1 * | 4/2016 | Sherwood | B65G 21/22 198/678.1 |

FOREIGN PATENT DOCUMENTS

| | | | | |
|---|---|---|---|---|
| FR | | 2553069 | 4/1985 | |
| JP | | 62021605 | A * 1/1987 | B65G 15/48 |
| WO | WO2013152990 | | 10/2013 | |

OTHER PUBLICATIONS 2008 brochure for "MacDon Flex and Rigid Draper Headers for Combines" (2008).
European search report for EP 18166129 dated on Jul. 12, 2018.

* cited by examiner

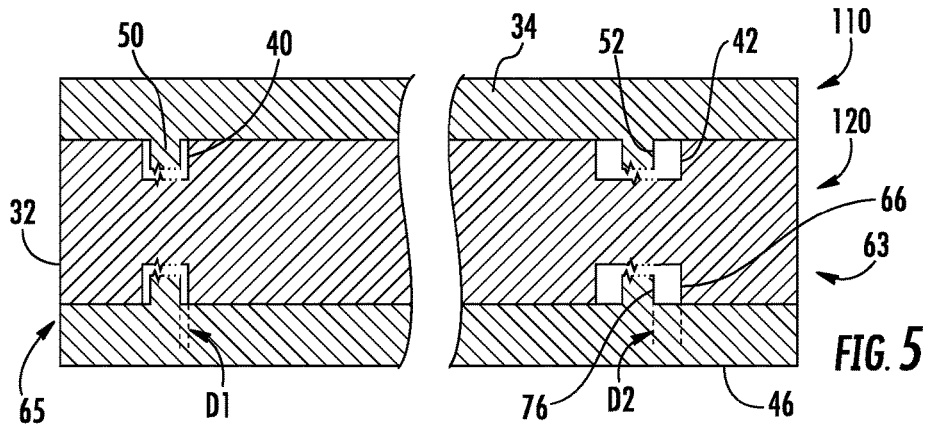
FIG. 5
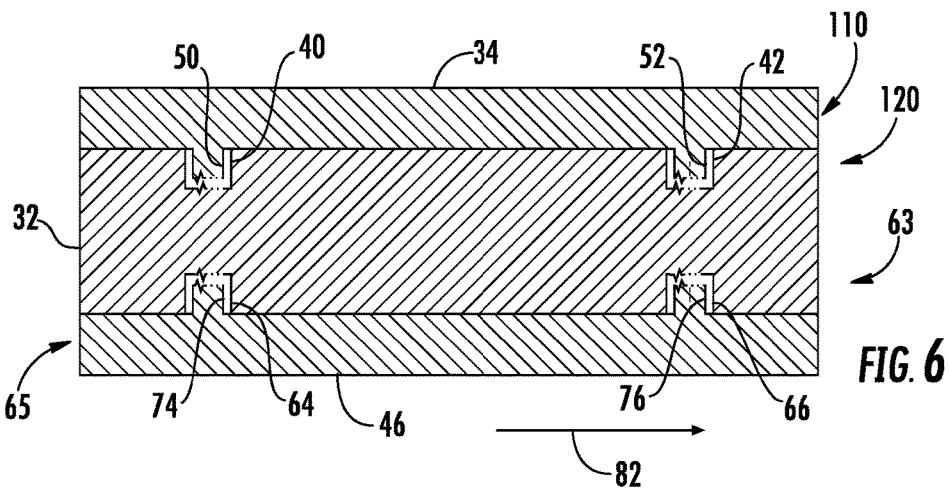
FIG. 6
FIG. 7

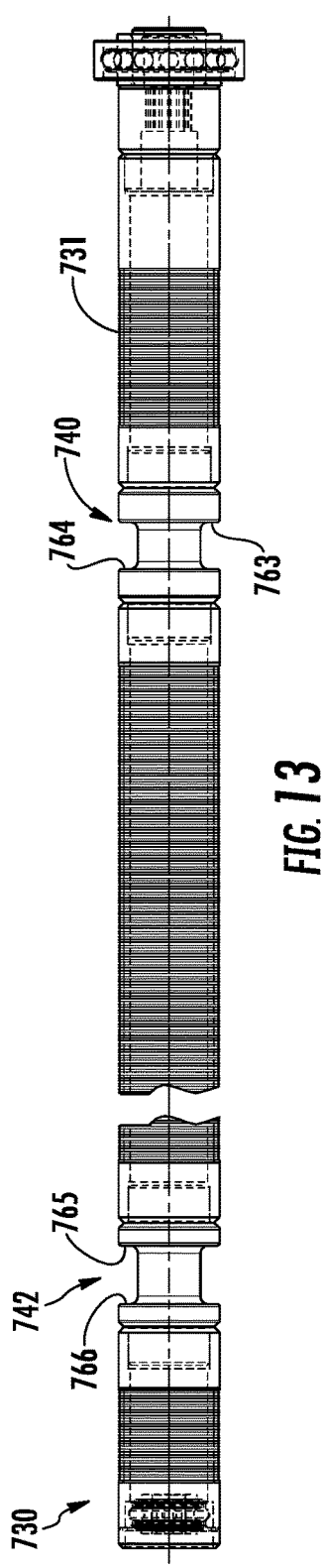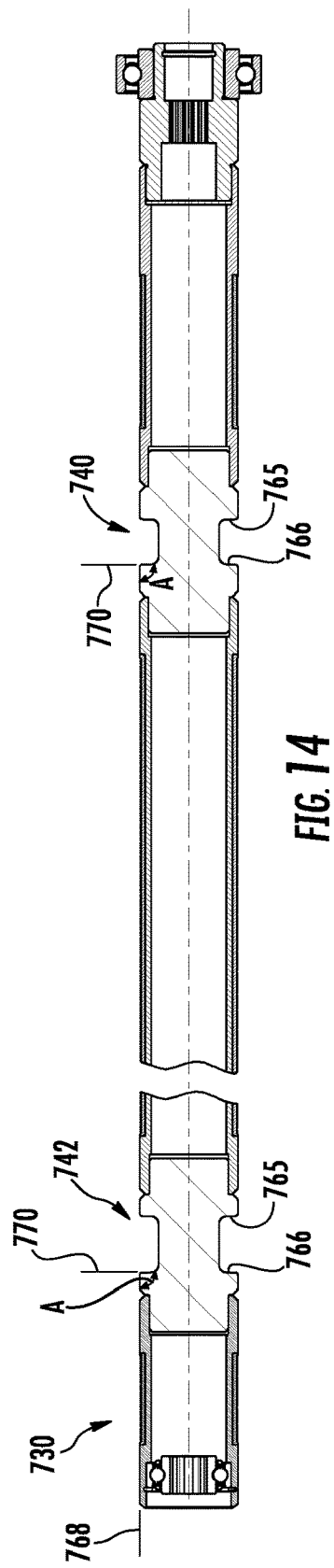

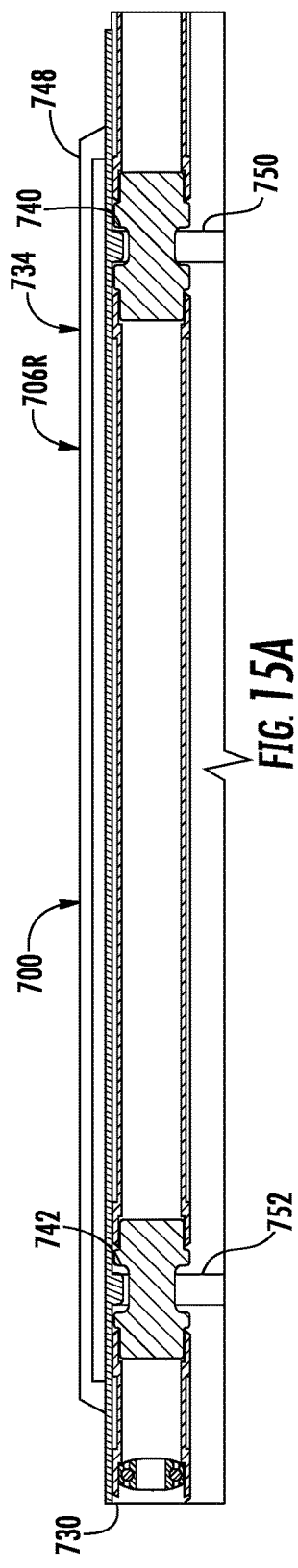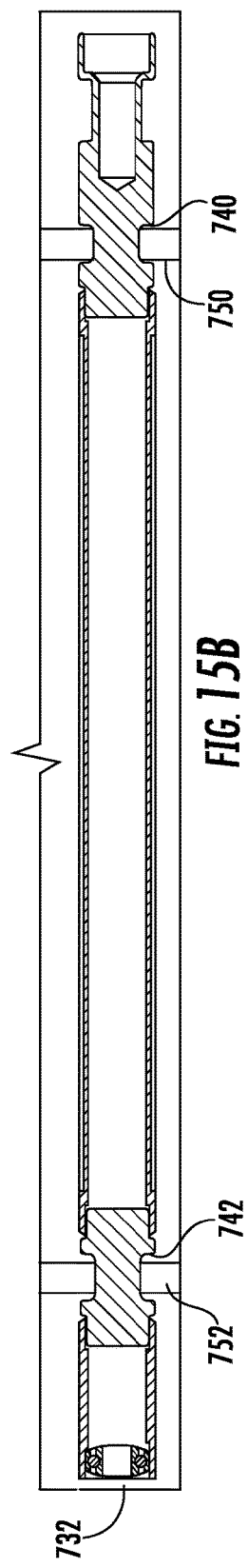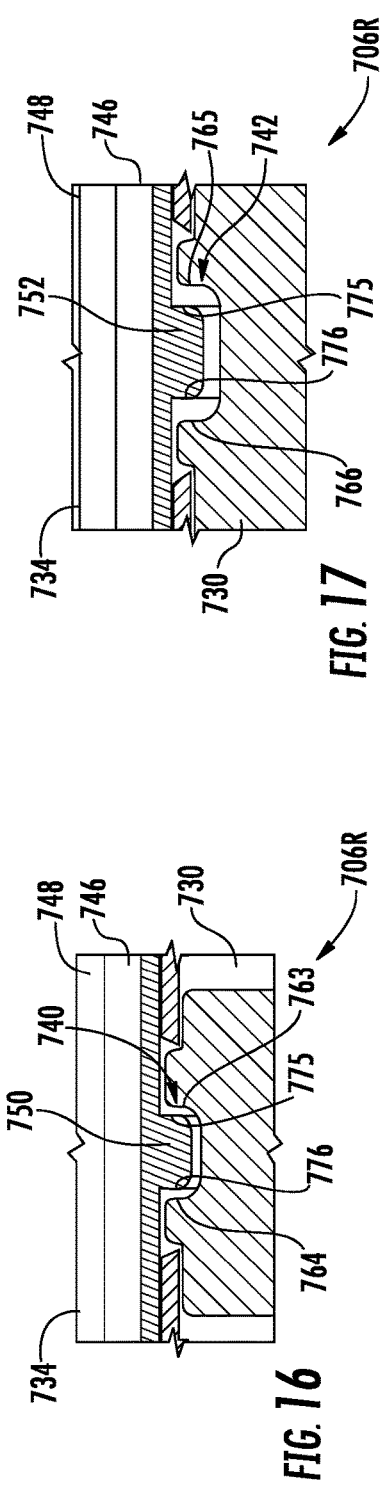

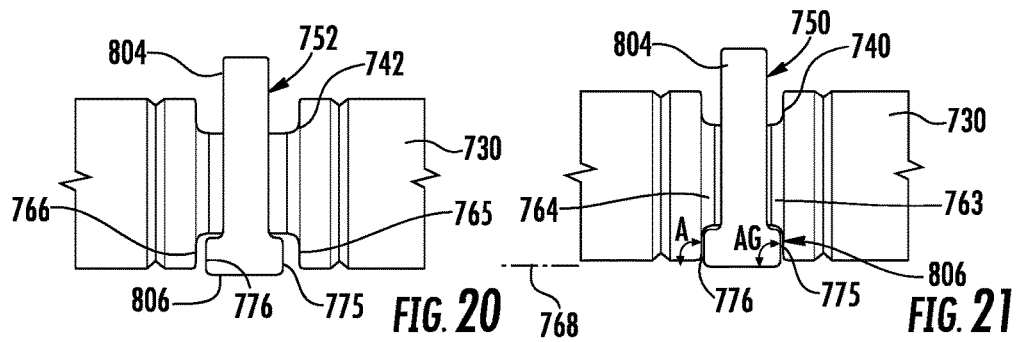
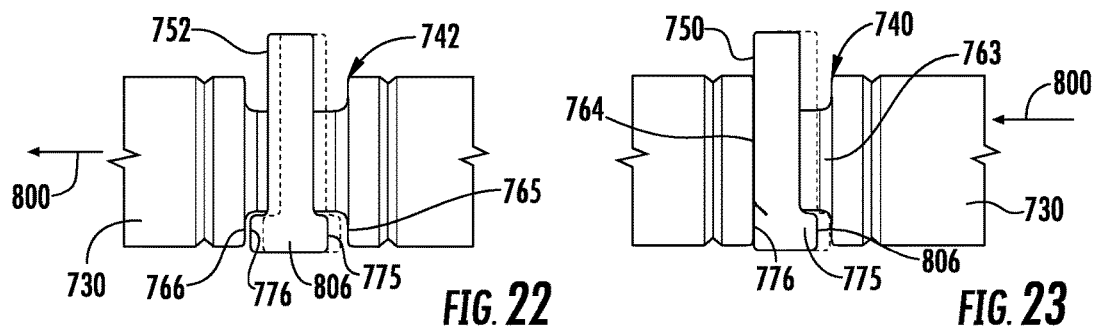
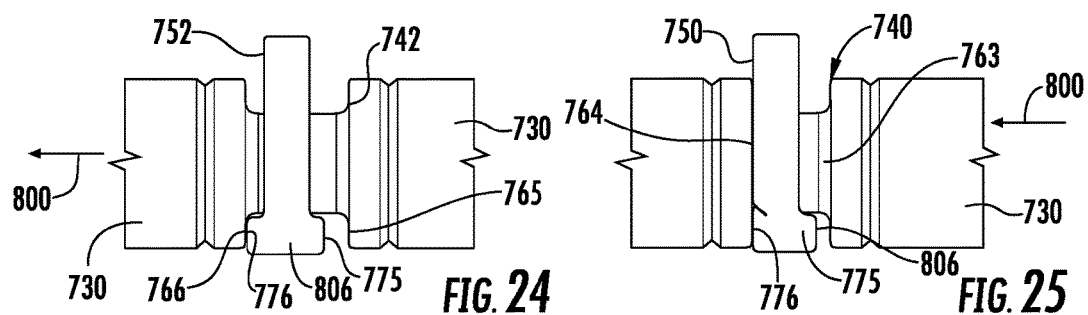
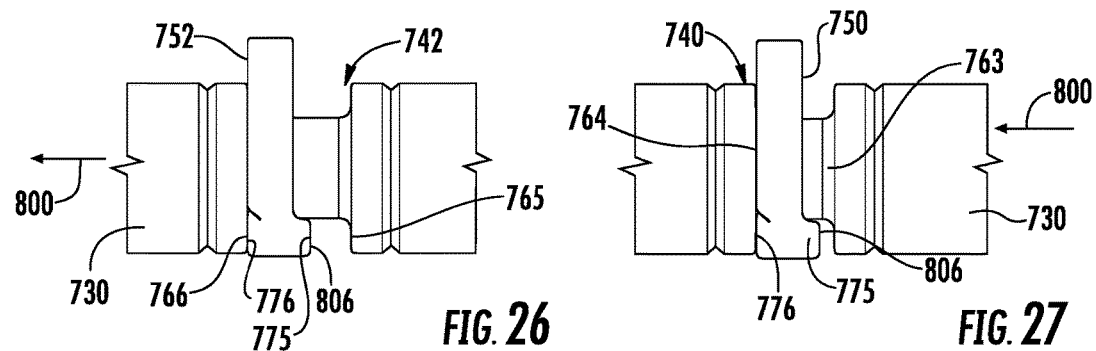

DRAPER BELT ASSEMBLY

CROSS-REFERENCE TO RELATED PATENT APPLICATIONS

The present application is related to co-pending U.S. patent application Ser. No. 15/494,482 filed on Apr. 22, 2017 by Anthony M. Hasenour and entitled DRAPER BELT GUIDE, the full disclosure of which is hereby incorporated by reference.

BACKGROUND

Draper belts are used on harvester heads to convey severed crop material transversely across the head to a feeder housing that further conveys the crop material into the harvester for handling, such as threshing and cleaning. During operation, the draper belts may become misaligned, potentially damaging the belt or other components of the harvester head.

BRIEF DESCRIPTION OF THE DRAWINGS

FIG. 5 is a sectional view of another example implementation of the drive belt assembly of FIG. 2 taken along line 3-3.

FIG. 6 is a sectional view of the example draper belt assembly of FIG. 5 when experiencing axial loading.

FIG. 7 is a flow diagram of portions of an example method for retaining alignment of an example draper belt respect to supporting rollers.

FIG. 13 is a side view of an example roller of one of the example draper belt assemblies of FIG. 11.

FIG. 14 is a sectional view of the roller of FIG. 13.

FIG. 15A is a sectional view of one of the example draper belt assemblies of FIG. 11, illustrating an example draper belt extending about a first example drive roller.

FIG. 15B is a sectional view of one of the example draper belt assemblies of FIG. 11, illustrating an example draper belt extending about a first example idler roller.

FIG. 16 is an enlarged view of a first portion of the sectional view of FIG. 15, illustrating an example master groove of the example drive roller.

FIG. 17 is an enlarged view of a second portion of the sectional view of FIG. 15, illustrating an example slave groove of the example drive roller.

FIG. 20 is a top view of an example slave groove of a roller of one of the draper belt assemblies of FIG. 18 receiving a first example draper belt guide.

FIG. 21 is a top view of an example master groove of the roller of FIG. 18 receiving a second example draper belt guide.

FIG. 22 is a top view of the example slave groove of the roller of FIG. 20 receiving the first example draper belt guide during a first stage of axial loading during flexing of the draper belt assembly of FIG. 19.

FIG. 23 is a top view of the example master groove of the roller of FIG. 21 receiving the second example draper belt guide during the first stage of axial loading during flexing of the draper belt assembly of FIG. 19.

FIG. 24 is a top view of the example slave groove of the roller of FIG. 20 receiving the first example draper belt guide during a second stage of axial loading during flexing of the draper belt assembly of FIG. 19.

FIG. 25 is a top view of the example master groove of the roller of FIG. 21 receiving the second example draper belt guide during the second stage of axial loading during flexing of the draper belt assembly of FIG. 19.

FIG. 26 is a top view of the example slave groove of the roller of FIG. 20 receiving the first example draper belt guide during a third stage of axial loading during flexing of the draper belt assembly of FIG. 19.

FIG. 27 is a top view of the example master groove of the roller of FIG. 21 receiving the second example draper belt guide during the third stage of axial loading during flexing of the draper belt assembly of FIG. 19.

DETAILED DESCRIPTION OF EXAMPLES

Disclosed herein are example harvester head draper belts that provide sequential or staged loading or interaction between the projections or guides of the draper belt and internal surfaces of the grooves of at least one roller supporting the draper belt. The sequential loading or interaction between the draper belt guides and the internal surfaces of the groove that receives such guides provides enhanced retention of the draper belt with respect to the roller or rollers in response to axial loads.

Disclosed is an example harvester head may include a roller having a first groove with a first interior side surface facing in a first direction and a second groove with a second interior side surface facing in the first direction. The second interior side surface is axially spaced from the first interior side surface by a first distance. The example harvester head may further include a draper belt having a web and first and second elastomeric belt guides received within the first and second grooves, respectively. The first belt guide may have a first exterior side surface facing in a second direction opposite the first direction and axially spaced from the first interior side surface by first distance. The second belt guide may have a second exterior side surface facing in the second direction, axially spaced from the second interior side surface by second distance greater than the first distance in absence of axial loads to the draper belt.

Disclosed herein is an example harvester head that may include a first roller having a first groove and a second groove, a second roller having a first groove having a first width and a second groove having a second width greater than the first width and a draper belt. The draper belt is supported by the first roller and the second roller and may include a web, a first elastomeric belt guide within the first groove and a second elastomeric belt guide within the second groove of the second roller. The second belt guide has a belt guide width less than the second width of the second groove of the second roller.

Disclosed is an example method which may include guiding a draper belt extending about a roller with a first belt guide extending in a first groove of the roller and a second belt guide extending within a second groove of the roller and sequentially contacting exterior sides of the first belt guide and the second belt guide with interior sides of the first groove and the second groove, respectively, in response to axial forces exerted upon the draper belt.

Figure 1:
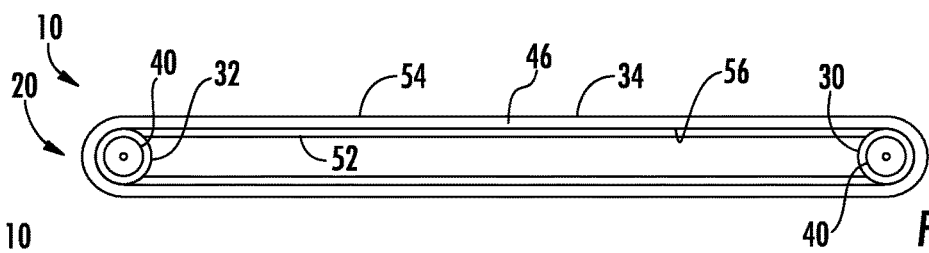
FIG. 1 is a sectional view of an example draper belt assembly as part of a harvester head.
Figure 2:
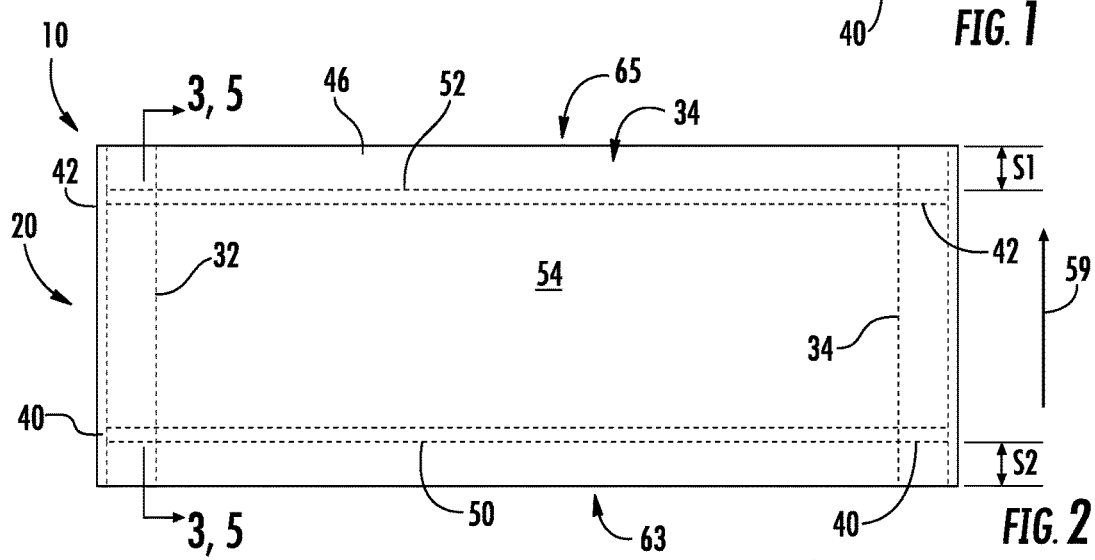
FIG. 2 is a top view of the example draper belt assembly of FIG. 1.

FIGS. 1-2 illustrate portions of an example harvester head 10 having an example draper belt assembly 20. Harvester head 10 is employed on harvester to sever crops from a growing medium and to convey the crops into the harvester for further processing, such as threshing and cleaning. Draper belt assembly 20 assists in conveying the severed crop towards a central feed location or feeder house of the harvester. Although harvester head 10 is illustrated as comprising a single draper belt assembly 20, harvester head 10 may comprise multiple draper belt assemblies on opposite sides of the central feed location or feeder house.

Draper belt assembly 20 comprises rollers 30, 32 and draper belt 34. Rollers 30, 30 to support draper belt 34. In the example illustrated, one of rollers roller 30 comprises a drive roller, operably coupled to a rotational driver source of torque. Roller 32 comprises an idler roller, roller not driven under power, but rotated in response to belt 34 being driven about roller 32. Each of rollers 30, 32 comprises a pair of axially spaced grooves 40, 42 which circumscribe rollers 30, 32.

Draper belt 34 comprises a continuous belt extending between and wrapping about rollers 30, 32. Draper belt 34 comprises a web 46 and belt guides 50, 52. Web 46 comprises an elongate expanse of material having sufficient flexibility so as to wrap about rollers 30, 32. In one implementation, web 46 is formed from an elastomeric material such as rubber. As shown by FIG. 1, web 46 an outer surface 54 and an inner surface 56. Inner surface 54 faces rollers 30, 32. Outer surface 56 faces outwardly, away from rollers 30, 32. In one implementation, outer surface 56 may additionally support a multitude of spaced cleats which facilitate the conveyance of crop material.

Belt guides 50, 52 comprise a pair of spaced ribs or protuberances projecting from inner surface 56 of web 46 at axially spaced locations so as to extend within grooves 40, 42, respectively, of rollers 30, 32. In one implementation, belt guides 50, 52 are formed from an elastomeric material such as an extruded rubber or rubber-like material. In one implementation, belt guides 50, 52 are integrally formed as a single unitary body with web 46. For example, in one implementation, web 46 and belt guides 50, 52 may be extruded as a single unitary body. In another implementation, belt guides 50, 52 are separately formed from web 46 and are bonded, welded, snapped, fastened or otherwise secured to the inner surface.

Belt guides 50, 52 cooperate with grooves 40, 42 of rollers 30, 32 to provide sequential or staged loading or interaction between the outer sides of guides 50, 52 of the draper belt and internal surfaces of the grooves 40, 42. The sequential loading or interaction between the draper belt guides 50, 52 and the internal surfaces of the grooves 40, 42 that receive such guides provides enhanced retention of the draper belt 34 with respect to the rollers 30, 32 in response to axial loads, loads exerted upon in directions parallel to the rotational axes of rollers 30, 32.

Figure 3:
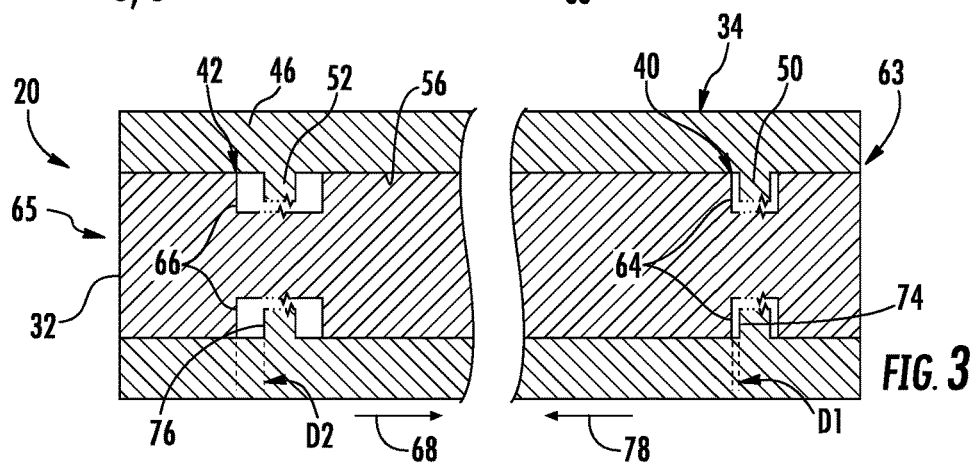
FIG. 3 is a sectional view of the example draper belt assembly of FIG. 2 taken along line 3-3.

FIG. 3 schematically illustrates a portion of draper belt assembly 20 in more detail. FIG. 3 illustrates the relative positions of draper belt 34 relative to roller 32, prior to draper belt 34 wrapping or turning about roller 32 and in the absence of axial loads (loads having a force component parallel to the axis of roller 32). Roller 32 comprises grooves 40, 42, the left sides of which are fixed while the right sides of such grooves are shown as having indeterminate spacing from the left sides, resulting in grooves 40, 42 having indeterminate width. Groove 40 extends proximate to a front edge 63 (shown in FIG. 2) of draper belt assembly 20 and a front or forward side of header 10 while groove 42 extends proximate to a rear edge 65 of draper belt assembly 20 and a rear side of header 10. Grooves 40 and 42 have interior side surfaces 64 and 66, respectively, facing in the axial direction indicated by arrow 68 towards the front edge 63 (shown in FIG. 2) of draper belt 34. Although illustrated as being substantially perpendicular to the axis of roller 32, in other implementations, the interior side surfaces 64, 66 may extend at other angles from the outer surface of roller 32 towards the rotational axis of roller 32.

Belt guides 50, 52, the left sides of which are fixed while the right sides or right outer surfaces of such guides are shown as having an indeterminate spacing from the left sides, resulting in guides 50, 52 having an indeterminate width. Belt guides 50, 52 have exterior side surfaces 74, 76, respectively, facing in the axial direction indicated by arrow 78, facing interior side surfaces 64, 66, respectively. Although illustrated as being substantially perpendicular to the inner surface 56 of web 46, in other implementations, the exterior side surfaces 74, 76 may extend at other angles from the inner surface 56 of web 46.

As further shown by FIG. 3, exterior side surfaces 74 of guide 50 are axially spaced from interior side surfaces 64 of groove 40 by a first distance D1 in the absence of axial loading on draper belt 34. Exterior side surfaces 76 of guide 52 are axially spaced from interior side surfaces 66 of groove 42 by second distance D2 that is greater than the first distance D1 in the absence of axial loading on draper belt 34. The different spacing between the opposing side surfaces 64, 74 and opposing side surfaces 66, 76 results in sequential or staged loading in interaction between guides 50, 52 and grooves 40, 42.

Because surface 64 of groove 40 is in closer axial proximity to the received belt guide 50 and initially engages or contacts received belt guide 50 upon axial movement of portion of draper belt 34, groove 40 may be referred to as the "master" groove. Because surface 66 of groove 42 is further spaced from the received belt guide 52 and engages or contacts the received belt guide 52 after contact between the opposing sides of belt guide 50 and groove 40, groove 42 may be referred to as the "slave" groove. Likewise, because belt guide 50 is received within master groove 40, belt guide 50 may be referred to as the master belt guide. Because belt guide 52 is received within the slave groove 42, belt guide 52 may be referred to as a slave belt guide.

Figure 4:
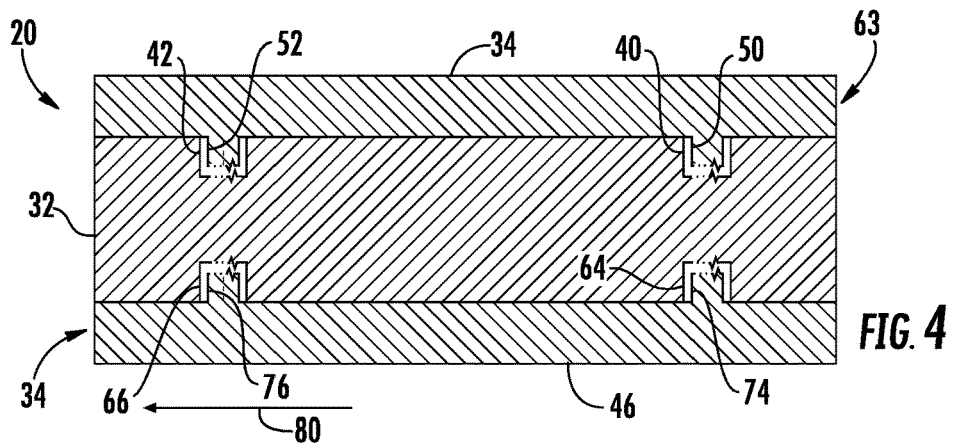
FIG. 4 is a sectional view of the example draper belt assembly of FIG. 3 when experiencing axial loading.

FIG. 4 illustrates such sequential or staged loading and interaction in response to an axial load upon draper belt 34, occurring in the direction indicated by arrow 80. Upon initial axial loading in the direction indicated by arrow 80, exterior sidewall 74 first encounters and contacts interior side wall 64 of groove 40 as shown in FIG. 4. During such initial contact of interior side wall 64 with sidewalls 74, exterior sidewall 76 of belt guide 52 is spaced from and out of contact with interior side wall 66 of groove 42 (as shown in FIG. 3 and as shown in broken lines in FIG. 4). Continued load or force applied to draper belt 34 in the direction indicated by arrow 80 (or having a component force in the direction indicated by arrow 80) moves draper belt 34 a sufficient distance to the left in the direction indicated by arrow 80 such that exterior sidewall surface 76 of belt guide 52 moves into contact with interior sidewall surface 66 of groove 42 as shown in FIG. 4. This multistage or sequential interaction or contact between guides 50, 52 and grooves 40, 42 respectively, assists in retaining belt guides 50 and 52 within grooves 40 and 42 during such axial loading of draper belt 34, wherein once such loading has stopped, belt guides 50, 52 resiliently return draper belt 34 to the initial aligned state.

In one example implementation, distance D2 is at least 3 mm greater than distance D1 when belt guides 50, 52 reside within grooves 40 and 42 when, for example, harvester head 10 is stationary, when draper belt 34 is mounted upon rollers 30, 32 or in the absence of axial loading or axial forces being exerted upon draper belt 34 that would tend to move draper belt 34 in an axial direction (parallel to the rotational axes of rollers 30, 32). In other implementations, distance D2 may have other values so long as axial movement of draper belt 34 results in side surfaces 74 of guide 50 first contacting the interior sides 64 of groove 40 before side surfaces 76 first contacting the interior sides 66 of groove 42. In one implementation, distance D2 is no greater than 6 mm.

In some implementations, the exterior sidewall of guide 52 opposite to exterior sidewall 76 may also be spaced from the opposite interior sidewall of groove 42 (the interior sidewall on the right side of groove 42 as seen in FIGS. 3 and 4) by a distance greater than the spacing between the exterior sidewall of guide 50 opposite the exterior sidewall 74 and the opposing interior sidewall of groove 40 (the interior sidewall on the right side of groove 40 as seen in FIGS. 3 and 4) such that multistage or sequential interaction or contact between guides 50, 52 and grooves 40, 42, respectively, is also provided in response to axial movement or loading in a direction opposite to that shown by arrow 80. In other words, guide 52 is axially spaced from both of the interior side walls of groove 42 by greater distances as compared to the distance separating both sides of guide 50 with respect to the interior side walls of groove 40. The resulting system provides bidirectional multistage or sequential interaction between guides 50, 52 and grooves 40, 42, respectively.

As shown by FIG. 2, in the example illustrated, interior side surface 66 of slave groove 42 is spaced from the rear edge 65 by a spacing S1 of no greater than 200 mm in the absence of axial loading or axial movement of guide 52 of draper belt 34 in response to such axial loading. Likewise, interior side surface 64 of master groove 40 is spaced from the front edge 63 by a spacing S2 of no greater than 200 mm in the absence of axial loading or axial movement of guide 50 of draper belt 34 in response to such axial loading. The close proximity of surfaces 64, 66 to edges 65 and 63, respectively, enhances retention of draper belt 34 by guides 50, 52 and their interaction with grooves 40 and 42. The close proximity of surfaces 64, 66 to edges 63 and 65 further increase the distance separating surfaces 64 and 66 to further enhance retention performance of belt guides 50, 52 and their corresponding grooves 40, 42.

In another implementation, interior sides of the 66 of slave groove 42 is spaced from rear edge 65 by a spacing S of no greater than 150 mm in the absence of axial loading or axial movement of guide 50 of draper belt 34 in response to such axial loading. Although FIGS. 3 and 4 illustrate roller 32 and its interaction with guides 50, 52, it should be appreciated that roller 30 may be similarly configured or constructed and have similar interactions with guides 50 and 52.

FIGS. 5 and 6 are sectional views of a portion of another example harvester head 110 having an alternative draper belt assembly 120. Draper belt assembly 120 is similar to draper belt assembly 20 except that draper belt assembly 120 switches the relative locations of the master groove and the slave groove as well as their received belt guides, alternatively locating the master groove 40 proximate the rear edge 65 of draper belt 34 and locating the slave groove 42 proximate the front edge 63 draper belt 34. Those components of draper belt assembly 120 which correspond to components of draper belt assembly 20 are numbered similarly. As shown by FIG. 6, grooves 40 and 42 and belt guides 50 and 52 of assembly 120 are identical to grooves 40 and 42 and belt guides 50 and 52 of assembly 20 except that surfaces 64 and 66 of grooves 40 and 42 face to the left (as seen in FIG. 5) in a direction towards rear edge 65 of draper belt 34 and that surfaces 74 and 76 of belt guide 50, 52 to the right (as seen in FIG. 5) in a direction towards front edge 63 of draper belt 34.

FIG. 6 illustrates such sequential or staged loading and interaction in response to an axial load upon draper belt 34, occurring in the direction indicated by arrow 82. Upon initial axial loading in the direction indicated by arrow 82, exterior sidewall 74 first encounters and contacts interior side wall 64 of groove 40 as shown in FIG. 6. During such initial contact of interior side wall 64 with sidewalls 74, exterior sidewall 76 of belt guide 52 is spaced from and out of contact with interior side wall 66 of groove 42 (as shown in FIG. 5 and as shown in broken lines in FIG. 6). Continued load or force applied to draper belt 34 in the direction indicated by arrow 82 (or having a component force in the direction indicated by arrow 82) moves draper belt 34 a sufficient distance to the right in the direction indicated by arrow 82 towards the front of header 110 such that exterior sidewall surface 76 of belt guide 52 moves into contact with interior sidewall surface 66 of groove 42 as shown in FIG. 6. This multistage or sequential interaction or contact between guides 50, 52 and grooves 40, 42 respectively, assists in retaining belt guides 50 and 52 within grooves 40 and 42 during such axial loading of draper belt 34, wherein once such loading has stopped, belt guides 50, 52 resiliently return draper belt 34 to the initial aligned state.

In some implementations, the exterior sidewall of guide 52 opposite to exterior sidewall 76 may also be spaced from the opposite interior sidewall of groove 42 (the interior sidewall on the right side of groove 42 as seen in FIGS. 3 and 4) by a distance greater than the spacing between the exterior sidewall of guide 50 opposite the exterior sidewall 74 and the opposing interior sidewall of groove 40 (the interior sidewall on the right side of groove 40 as seen in FIGS. 3 and 4) such that multistage or sequential interaction or contact between guides 50, 52 and grooves 40, 42, respectively, is also provided in response to axial movement or loading in a direction opposite to that shown by arrow 80. In other words, guide 52 is axially spaced from both of the interior side walls of groove 42 by greater distances as compared to the distance separating both sides of guide 50 with respect to the interior side walls of groove 40. The resulting system provides bidirectional multistage or sequential interaction between guides 50, 52 and grooves 40, 42, respectively.

FIG. 7 is a flow diagram of an example method 200 for retaining alignment of the harvester head. Method 200 is described as being carried out by draper belt assembly 20. However, it should be appreciative that method 200 may be carried out with any of the driven belts and the respective rollers provided in this disclosure, such as draper belt assembly 120, the subsequently disclosed draper belt assemblies or similarly configured draper belt assemblies.

As indicated by block 204, draper belt 34, extending about a roller, such as roller 30 or roller 32, is guided by a first belt guide of the belt extending in a first groove of the roller and a second belt guide of the belt extending within a second groove of the roller. As indicated by block 204, exterior sides of the first belt guide and the second belt guide sequentially contact the interior sides of the first groove in the second groove, respectively, in response to axial forces upon the draper belt 34.

Figure 8:
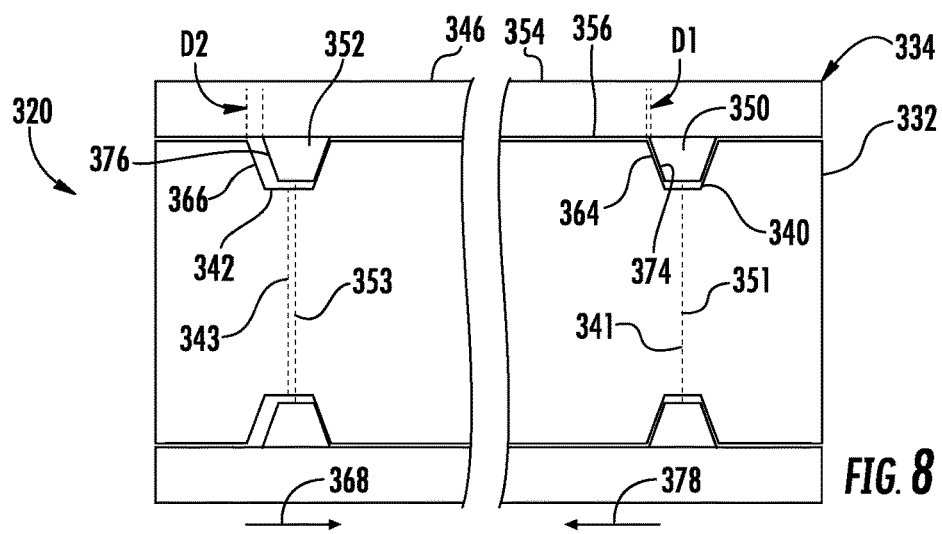
FIG. 8 is a sectional view of portions of another example draper belt assembly.
Figure 9:
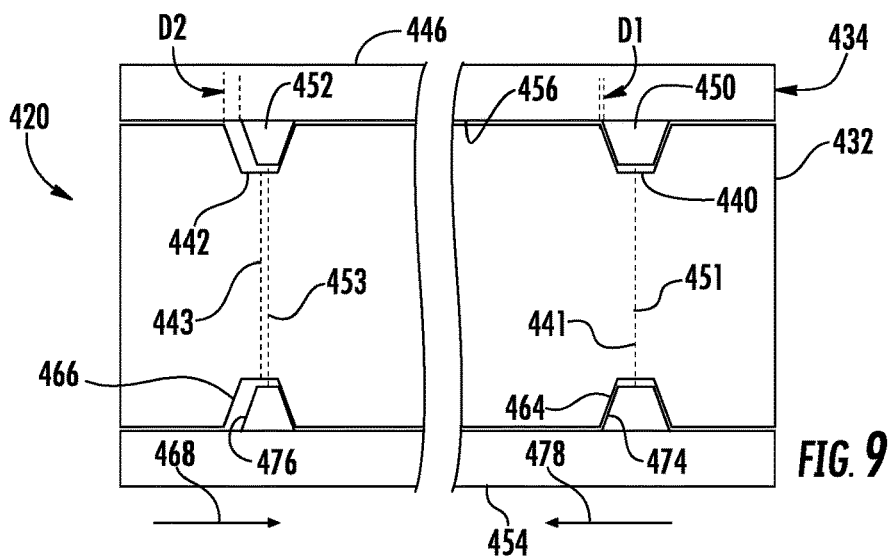
FIG. 9 is a sectional view of portions of another example draper belt assembly.
Figure 10:
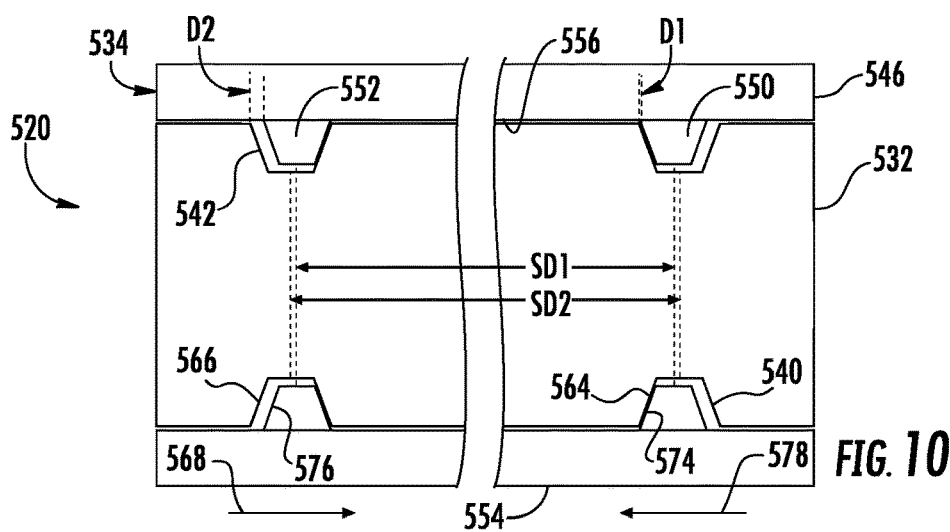
FIG. 10 is a sectional view of another example draper belt assembly.

FIGS. 8-10 are sectional views illustrating various different example draper belt assemblies that may be used on header 10 and that provide sequential or staged loading/interaction between roller grooves and the belt guides received within the roller grooves. FIG. 8 illustrates an example draper belt assembly 320 which provides sequential or staged loading/interaction by utilizing a roller having differently sized master and slave grooves. In particular, the slave groove is wider or has a longer axial dimension as compared to the master groove. As indicated above, the master groove is the groove having a side surface that initially contacts its received belt guide whereas the slave groove is the groove having a side service that subsequently contacts its received belt guide.

As shown by FIG. 8, draper belt assembly 320 comprises a pair of spaced rollers 332 (one of which is shown) and draper belt 334. Rollers 332 guide and support draper belt 334. One of such rollers 330, 332 may comprise a drive roller operably coupled to a drive mechanism while the other of such rollers 330, 332 may comprise an idler roller. Roller 332 comprises a master groove 340 and a slave groove 342. In one implementation, slave groove 342 is proximate to a front edge of draper belt 334 and a front of the header in which draper belt assembly 320 is utilized, similar to the positioning of slave groove 42 in assembly 120. In another implementation, slave groove 342 is proximate to a rear edge of draper belt 334 and a rear of the header in which draper belt assembly 320 is utilized, similar to the positioning of slave groove 42 in assembly 20.

In the example illustrated, master groove 340 has a first axial length or axial dimension while slave groove 342 has a second longer axial length or axial dimension. In the example illustrated, master groove 340 and slave groove 342 each have similar shapes. In the example illustrated, master groove 340 and slave groove 342 each comprise a V-groove having side surfaces extending from the exterior of roller 332 that tapers towards one another. In other implementations, grooves 340, 342 may have other shapes.

Draper belt 334 extends about or wraps about each of rollers 330, 332 similar to draper belt 34 shown in FIG. 1. In one implementation, draper belt 334 comprises a continuous or endless belt. In another implementation, draper belt 334 comprises a seamed belt having end portions welded, fused, fastened or otherwise secured to one another. Belt 334 comprises web 346, master belt guide 350 and slave belt guide 352.

Web 346 is similar to web 46 described above. Web 346 comprises an elongate expanse of material having sufficient flexibility so as to wrap about rollers 332. In one implementation, web 346 is formed from an elastomeric material such as rubber. Web 346 has an outer surface 354 and an inner surface 356. Inner surface 354 faces rollers 330, 332. Outer surface 356 faces outwardly, away from rollers 330, 332. In one implementation, outer surface 356 may additionally support a multitude of spaced cleats along the length of web 346 which facilitate the conveyance of crop material.

Belt guides 350, 352 comprise a pair of spaced ribs or protuberances projecting from inner surface 356 of web 346 at axially spaced locations so as to extend within grooves 340, 342, respectively, of rollers 330, 332. In one implementation, belt guides 350, 352 are formed from an elastomeric material such as an extruded rubber or rubber-like material. In one implementation, belt guides 350, 352 are integrally formed as a single unitary body with web 346. For example, in one implementation, web 346 and belt guides 350, 352 may be extruded as a single unitary body. In another implementation, belt guides 350, 352 are separately formed from web 346 and are bonded, welded, snapped, fastened or otherwise secured to the inner surface.

Belt guides 350, 352 cooperate with grooves 340, 342 of rollers 330, 332 to provide sequential or staged loading or interaction between the outer sides of guides 350, 352 of the draper belt and internal surfaces of the grooves 340, 342. The sequential loading or interaction between the draper belt guides 350, 352 and the internal surfaces of the grooves 340, 342 that receive such guides provides enhanced retention of the draper belt 334 with respect to the rollers 330, 332 in response to axial loads, loads exerted upon in directions parallel to the rotational axes of rollers 330, 332. In the example illustrated, belt guides 350 and 352 are substantially similar or even identical to one another in size and shape such that draper belt 354 may be reversed, locating belt guide 350 in slave groove 342 and locating belt guide 352 in master groove 340 to prolong the use of draper belt 354.

FIG. 8 illustrates the relative positions of draper belt 334 relative to roller 332, prior to draper belt 334 wrapping or turning about roller 332 and in the absence of axial loads (loads having a force component parallel to the axis of roller 332). Grooves 340 and 342 have interior side surfaces 364 and 366, respectively, facing in the axial direction indicated by arrow 368. Although illustrated as being V-shaped, in other implementations, the interior side surfaces 364, 366 may extend at other angles from the outer surface of roller 332 towards the rotational axis of roller 332.

Belt guides 350, 352 have exterior side surfaces 374, 376, respectively, facing in the axial direction indicated by arrow 378, facing interior side surfaces 364, 366, respectively. Although illustrated as being V-shaped, in other implementations, the exterior side surfaces 374, 376 may extend at other angles from the inner surface 356 of web 346. As further shown by FIG. 8, exterior side surfaces 374 of guide 350 are axially spaced from interior side surfaces 364 of groove 342 by a first distance D1 in the absence of axial loading on draper belt 334. As shown in broken lines, the centerline 351 of belt guide 350 coincides with the centerline 341 of master groove 340 while the centerline 353 of belt guide 352 is axially offset from the centerline 343 of slave groove 342. Due to the larger axial dimension of slave grooves 342, exterior side surfaces 376 of guide 352 are axially spaced from interior side surfaces 366 of groove 342 by second distance D2 that is greater than the first distance D1 in the absence of axial loading on draper belt 334. The different spacing between the opposing side surfaces 364, 374 and opposing side surfaces 366, 376 results in sequential or staged loading in interaction between guides 350, 352 and grooves 340, 342 in a fashion similar to that described above with respect to FIG. 4 or FIG. 6. In one implementation, the second distance is at least 3 mm larger than the first distance.

FIG. 9 illustrates an example draper belt assembly 420 which provides sequential or staged loading/interaction by utilizing the draper belt having differently configured belt guides. In one implementation, the slave belt guide is smaller or has a shorter axial dimension as compared to the master slave guide.

As shown by FIG. 9, draper belt assembly 420 comprises a pair of spaced rollers 430, 432 (one of which is shown) and draper belt 434. Rollers 430, 432 guide and support draper belt 434. One of such rollers 430 may comprise a drive roller operably coupled to a drive mechanism while the other of such rollers 432 may comprise an idler roller. Roller 432 comprises a master groove 440 and a slave groove 442. In one implementation, slave groove 442 is proximate to a front edge of draper belt 434 and a front of the header in which draper belt assembly 420 is utilized, similar to the positioning of slave groove 42 in assembly 120. In another implementation, slave groove 442 is proximate to a rear edge of draper belt 434 and a rear of the header in which draper belt assembly 420 is utilized, similar to the positioning of slave groove 42 in assembly 20.

In the example illustrated, master groove 440 and slave groove 442 have a same length or axial dimension. In the example illustrated, master groove 440 and slave groove 442 each have similar shapes. In the example illustrated, master groove 440 and slave groove 442 each comprise a V-groove having side surfaces extending from the exterior of roller 432 that tapers towards one another. In other implementations, grooves 440, 442 may have other shapes.

Draper belt 434 extends about or wraps about each of rollers 430, 432 similar to draper belt 434 shown in FIG. 1. In one implementation, draper belt 434 comprises a continuous or endless belt. In another implementation, draper belt 434 comprises a seamed belt having end portions welded, fused, fastened or otherwise secured to one another. Belt 434 comprises web 446, master belt guide 450 and slave belt guide 452.

Web 446 is similar to web 46 described above. Web 446 comprises an elongate expanse of material having sufficient flexibility so as to wrap about rollers 430, 432. In one implementation, web 446 is formed from an elastomeric material such as rubber. Web 446 has an outer surface 454 and an inner surface 456. Inner surface 454 faces rollers 430, 432. Outer surface 456 faces outwardly, away from rollers 430, 432. In one implementation, outer surface 456 may additionally support a multitude of spaced cleats along the length of web 446 which facilitate the conveyance of crop material.

Belt guides 450, 452 comprise a pair of spaced ribs or protuberances projecting from inner surface 456 of web 446 at axially spaced locations so as to extend within grooves 440, 442, respectively, of rollers 430, 432. In one implementation, belt guides 450, 452 are formed from an elastomeric material such as an extruded rubber or rubber-like material. In one implementation, belt guides 450, 452 are formed from styrene-butadiene rubber (SBR rubber). In one implementation, belt guides 450, 452 are integrally formed as a single unitary body with web 446. For example, in one implementation, web 446 and belt guides 450, 452 may be extruded as a single unitary body. In another implementation, belt guides 450, 452 are separately formed from web 446 and are bonded, welded, snapped, fastened or otherwise secured to the inner surface.

Belt guides 450, 452 cooperate with grooves 440, 442 of rollers 430, 432 to provide sequential or staged loading or interaction between the outer sides of guides 450, 452 of the draper belt and internal surfaces of the grooves 440, 442. The sequential loading or interaction between the draper belt guides 450, 452 and the internal surfaces of the grooves 440, 442 that receive such guides provides enhanced retention of the draper belt 334 with respect to the rollers 430, 432 in response to axial loads, loads exerted upon in directions parallel to the rotational axes of rollers 430, 432.

FIG. 9 illustrates the relative positions of draper belt 434 relative to roller 432, prior to draper belt 434 wrapping or turning about roller 432 and in the absence of axial loads (loads having a force component parallel to the axis of roller 432). Grooves 440 and 442 have interior side surfaces 464 and 466, respectively, facing in the axial direction indicated by arrow 468. Although illustrated as being V-shaped, in other implementations, the interior side surfaces 464, 466 may extend at other angles from the outer surface of roller 432 towards the rotational axis of roller 432.

Belt guides 450, 452 have exterior side surfaces 474, 476, respectively, facing in the axial direction indicated by arrow 478, facing interior side surfaces 464, 466, respectively. Although illustrated as being V-shaped, in other implementations, the exterior side surfaces 474, 476 may extend at other angles from the inner surface 456 of web 446. As further shown by FIG. 9, due in part to the smaller size of slave belt guide 452 as compared to master belt guide 450, exterior side surfaces 474 of guide 450 are axially spaced from interior side surfaces 464 of groove 440 by a first distance D1 in the absence of axial loading on draper belt 434 while exterior side surfaces 476 of guide 452 are axially spaced from interior side surfaces 466 of groove 442 by second distance D2 that is greater than the first distance D1 in the absence of axial loading on draper belt 434. As shown in broken lines, the centerline 451 of belt guide 450 coincides with the centerline 441 of master groove 440 while the centerline 453 of belt guide 452 is axially offset from the centerline 443 of slave groove 442. The different spacing between the opposing side surfaces 464, 474 and opposing side surfaces 466, 476 results in sequential or staged loading in interaction between guides 450, 452 and grooves 440, 442 in a fashion similar to that described above with respect to FIG. 4 or FIG. 6. In one implementation, the second distance is at least 3 mm larger than the first distance.

FIG. 10 illustrates an example draper belt assembly 520 which provides sequential or staged loading/interaction by utilizing different axial spacings between similarly configured belt guides similar, and similar but larger roller grooves.

As shown by FIG. 10, draper belt assembly 520 comprises a pair of spaced rollers 530, 532 (one of which is shown) and draper belt 534. Rollers 530, 532 guide and support draper belt 534. One of such rollers 530 may comprise a drive roller operably coupled to a drive mechanism while the other of such rollers 532 may comprise an idler roller. Roller 532 comprises a master groove 540 and a slave groove 542. In one implementation, slave groove 542 is proximate to a front edge of draper belt 534 and a front of the header in which draper belt assembly 520 is utilized, similar to the positioning of slave groove 42 in assembly 120. In another implementation, slave groove 542 is proximate to a rear edge of draper belt 534 and a rear of the header in which draper belt assembly 520 is utilized, similar to the positioning of slave groove 42 in assembly 20.

In the example illustrated, master groove 540 and slave groove 542 have a same length or axial dimension. In the example illustrated, master groove 540 and slave groove 542 each have similar shapes. In the example illustrated, master groove 540 and slave groove 542 each comprise a V-groove having side surfaces extending from the exterior of roller 532 that tapers towards one another. In other implementations, grooves 540, 542 may have other shapes.

Draper belt 534 extends about or wraps about each of rollers 530, 532, similar to draper belt 534 shown in FIG. 1. In one implementation, draper belt 534 comprises a continuous or endless belt. In another implementation, draper belt 534 comprises a seamed belt having end portions welded, fused, fastened or otherwise secured to one another. Belt 534 comprises web 546, master belt guide 550 and slave belt guide 552.

Web 546 is similar to web 46 described above. Web 546 comprises an elongate expanse of material having sufficient flexibility so as to wrap about rollers 530, 532. In one implementation, web 546 is formed from an elastomeric material such as rubber. Web 546 has an outer surface 554 and an inner surface 556. Inner surface 554 faces rollers 530, 532. Outer surface 556 faces outwardly, away from rollers 530, 532. In one implementation, outer surface 556 may additionally support a multitude of spaced cleats along the length of web 546 which facilitate the conveyance of crop material.

Belt guides 550, 552 comprise a pair of spaced ribs or protuberances projecting from inner surface 556 of web 546 at axially spaced locations so as to extend within grooves 540, 542, respectively, of rollers 530, 532. In one implementation, belt guides 550, 552 are formed from an elastomeric material such as an extruded rubber or rubber-like material. In one implementation, belt guides 550, 552 are integrally formed as a single unitary body with web 546. For example, in one implementation, web 546 and belt guides 550, 552 may be extruded as a single unitary body. In another implementation, belt guides 550, 552 are separately formed from web 546 and are bonded, welded, snapped, fastened or otherwise secured to the inner surface.

Belt guides 550, 552 cooperate with grooves 540, 542 of rollers 530, 532 to provide sequential or staged loading or interaction between the outer sides of guides 550, 552 of the draper belt and internal surfaces of the grooves 540, 542. The sequential loading or interaction between the draper belt guides 550, 552 and the internal surfaces of the grooves 540, 542 that receive such guides provides enhanced retention of the draper belt 534 with respect to the rollers 530, 532 in response to axial loads, loads exerted upon in directions parallel to the rotational axes of rollers 530, 532.

FIG. 10 illustrates the relative positions of draper belt 534 relative to roller 532, prior to draper belt 534 wrapping or turning about roller 532 and in the absence of axial loads (loads having a force component parallel to the axis of roller 532). Grooves 540 and 542 have interior side surfaces 564 and 566, respectively, facing in the axial direction indicated by arrow 568. Although illustrated as being V-shaped, in other implementations, the interior side surfaces 564, 566 may extend at other angles from the outer surface of roller 532 towards the rotational axis of roller 532.

Belt guides 550, 552 have exterior side surfaces 574, 576, respectively, facing in the axial direction indicated by arrow 578, facing interior side surfaces 564, 566, respectively. Although illustrated as being V-shaped, in other implementations, the exterior side surfaces 574, 576 may extend at other angles from the inner surface 556 of web 546. As further shown by FIG. 10, due in part to the smaller axial dimension of belt guides 550, 552 as compared to the longer axial ends of grooves 540, 542 and due to the centerlines of such belt guides 550, 552 being axially spaced from one another by a separation distance SD1 that is less than the separation distance SD2 between the centerlines of the two grooves 540, 542, exterior side surface 574 of guide 550 is axially spaced from interior side surfaces 564 of groove 540 by a first distance D1 in the absence of axial loading on draper belt 534 while exterior side surface 576 of guide 552 are axially spaced from interior side surfaces 566 of groove 542 by second distance D2 that is greater than the first distance D1 in the absence of axial loading on draper belt 34. The different spacing between the opposing side surfaces 564, 574 and opposing side surfaces 566, 576 results in sequential or staged loading in interaction between guides 550, 552 and grooves 540, 542 in a fashion similar to that described above with respect to FIG. 4 or FIG. 6. In one implementation, the second distance is at least 3 mm larger than the first distance.

Figure 11:
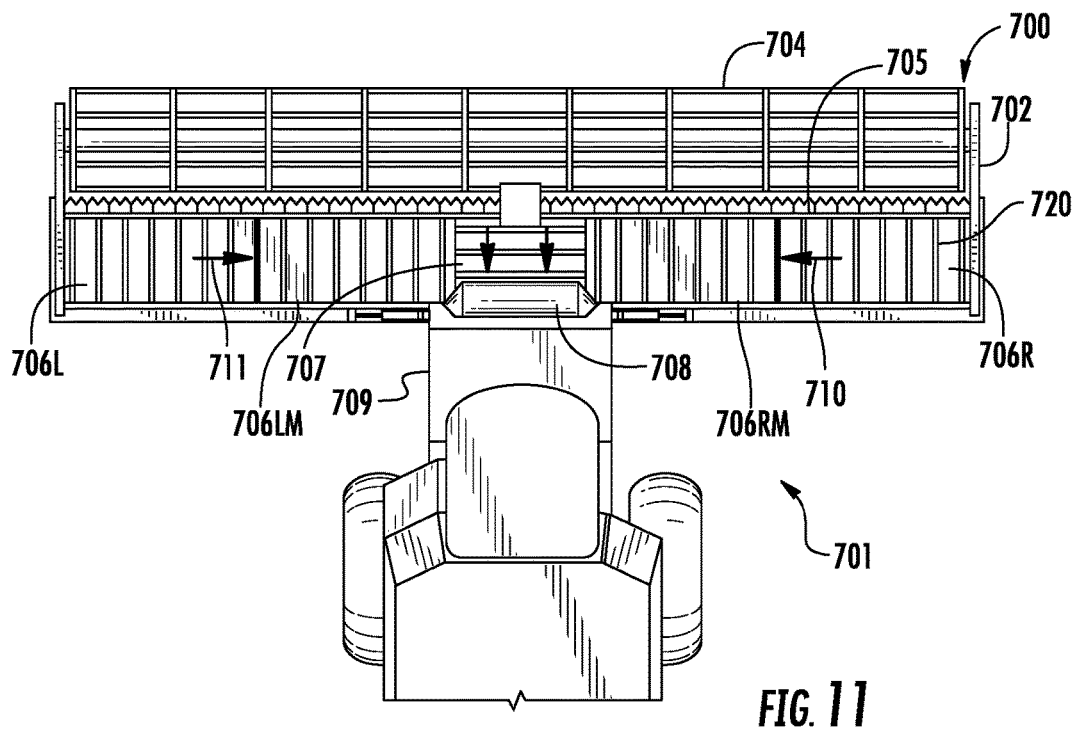
FIG. 11 is a fragmentary top view of an example harvester having an example header with example draper belt assemblies.
Figure 12:
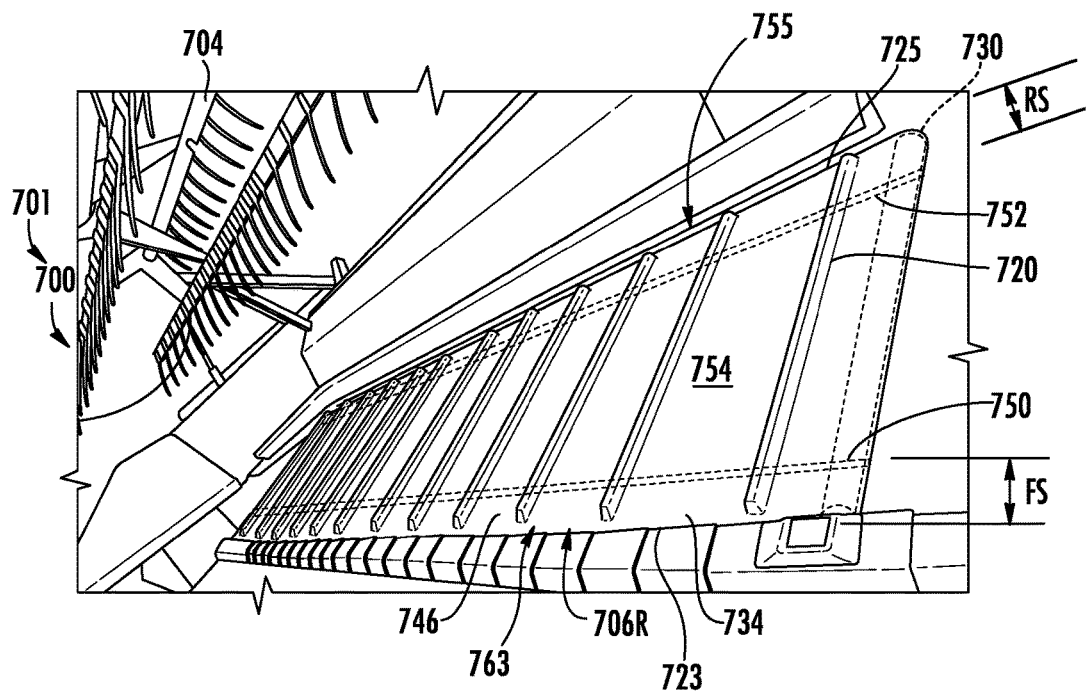
FIG. 12 is an enlarged fragmentary perspective view of a portion of the header of the harvester of FIG. 11.

FIGS. 11 and 12 illustrate an example illustrate an example harvester head or header 700 as part of a harvester 701. The example header 700 generally comprises frame 702, gathering reels 704, cutter assembly 705, draper belt assemblies 706L, 706LM, 706RM and 706R (collectively referred to as draper belt assemblies 706), central draper belt 707 and feed drum 708. Frame 702 forms the exterior of header 700 and supports remaining components of header 700. Frame 702 is configured to be releasably mounted to a combine harvester 701.

Gathering reels 704 gather and direct the crop towards cutter assembly 705. Cutter assembly 705 cuts and are severs the crop or plant from soil. Draper belt assemblies 706 comprise carpets, platforms or belts which are transversely driven so as to carry the severed plants or crops to central draper 707. Draper belt assembly 706R and draper belt assembly 706 RM carry the severed crops in the direction indicated by arrow 710 to central draper belt 707. Draper belt assembly 706L and draper belt assembly 706 LM carry the severed crops in the direction indicated by arrow 711 to central draper belt 707. Central draper belt 707 conveys the severed crop material to feed drum 708. Feed drum 708 is rotatably driven so as to move the severed crop material rearwardly into a feeder house 709 of harvester 701 for threshing.

FIG. 12 is an enlarged fragmentary view of a portion of header 700, illustrating one of draper belt assemblies 706R. Draper belt assembly comprises drive roller 730, an idler roller (not shown in FIG. 12) and draper belt 734. Drive roller 730 and the idler roller extend at opposite ends of draper belt 734 and support and guide movement of draper belt 734. As will be described hereafter, each of drive roller 730 and the idler roller include a pair of axially spaced groups, a master groove and a slave groove which receives belt guides of draper belt 734.

Draper belt 734 wraps about the drive roller 730 and the idler roller. In one implementation, draper belt 734 comprises a continuous endless belt. In another implementation, belt 734 comprises a seamed belt having ends welded, bonded, fastened or otherwise secured to one another. Draper belt 734 comprises web 746, exterior cleats 720, master belt guide 750 and slave belt guide 752. Cleats 720 comprise ribs, bars or other structures projecting from outer surface 754 of web 746. Cleats 720 transversely extend across web 746. Cleats 720 assist in conveying crop material. In other implementations, cleats 720 may have other configurations or may be omitted.

Belt guides 750 and 752 comprise elongate ribs, bars or projections extending from the inner surface of web 746 along substantially the entire length of web 746. In one implementation, belt guides 750, 752 are formed from styrene-butadiene rubber (SBR rubber) in are integrally formed as a single unitary body with web 746. In the example illustrated, master belt guide 750 extends along the front edge 763 of draper belt 734. Slave belt guide 752 extends along the rear edge 725 of draper belt 734. In one implementation, the master belt guide has a forward-most side surface or edge of the bar forming guide 750 that is transversely spaced from the front edge 723 by a front spacing FS of no greater than 200 mm. The slave belt guide has a rearmost side surface or edge of the bar forming guide 752 that is transversely spaced from the rear edge 725 by rear spacing RS of no greater than 200 mm. The close proximity of guides 750, 752 to the front edge 723 and the rear edge 725 of belt 706L may enhance retention of belt 706R in an aligned state.

FIGS. 13 and 14 illustrate roller 730 in greater detail. Roller 730 comprises an elongate generally cylindrical shaft 731 comprising master groove 740 and slave groove 742. Roller 730 facilitates sequential or staged loading or interaction through the use of differently sized grooves with slave groove 742 being larger than master groove 740 in a fashion similar to that described above with respect to roller 332 in FIG. 8.

Master groove 740 comprises interior side surfaces 763 and 764. Slave groove 740 comprises interior side surfaces 765 and 766. Side surfaces 763, 764, 765 and 766 have profiles or shapes that reduce the tendency of belt guides to ride up on such surfaces, in a direction away from floor of the grooves, in response to axial loading or forces. Interior side surfaces 763, 764, 765 and 766 are shaped such that a majority of such surfaces that extend below the outer surface of shaft 731 (prior to the possibly rounded junction with the floor the groove) and that are directly opposite to and face side surfaces of receive belt guides, that are angularly spaced from plane 768 by an angle A of no greater than 100 degrees. In one implementation, interior side surfaces 763, 764, 765 and 766 extend in planes 122, 124, respectively, that are angularly spaced from plane 116 by an angle A of no greater than 95°. In the example illustrated, interior side surfaces 763, 764, 765 and 766 extend in planes 770 that are perpendicular to plane 768. In some implementations, interior side surfaces 763, 764, 765 and 766 extend in planes 770 that are angularly spaced from plane 768 by an acute angle A (less than 90°) such that groove 740, 742 each have an undercut to enhance retention and capture of the received belt guide.

FIGS. 15-17 are sectional views illustrating portions of draper belt assembly 706L. FIG. 15A illustrates drive roller 730 at one end of assembly 706L and FIG. 15B illustrate idler roller 732 at the opposite end of assembly 706L. Each of rollers 730, 732 comprises a master groove 740 and a larger slave groove 742, both of which are described above with respect to roller 730.

Draper belt 734 wraps about rollers 730, 732 and is maintained in alignment with such rollers and the rest of header 700 through the sequential or stage interaction between belt guides 750, 752 and groove 740, 742, respectively. FIGS. 15A, 15B and 16-17 illustrate portions of draper belt 734 that are not turning or wrapping about rollers 730, 732, but are instead largely linearly extending between rollers 730, 732. Because such portions are not winding or wrapping about either roller 730, 732, the illustrated portions of belt guides 750, 752 are not in a state of expansion, occupying a smaller percentage of the interior volume of each of grooves 740, 742. In the example illustrated, belt guides 750, 752 have similar shapes and sizes, facilitating reversal of the orientation of draper belt 734, wherein guide 750 is located within groove 742 and guide 752 is located within groove 740.

Figure 18:
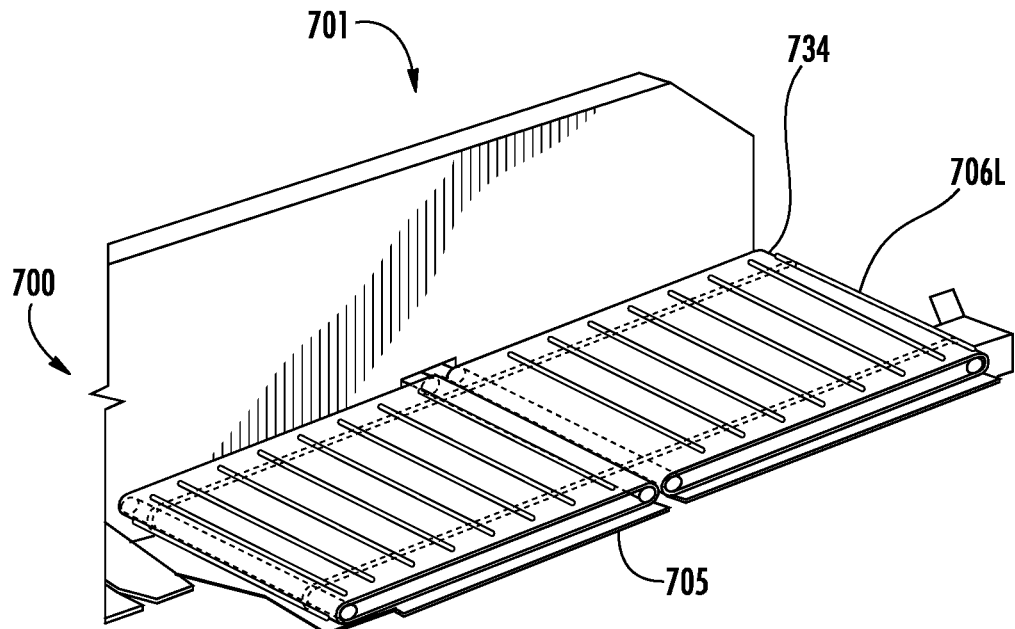
FIG. 18 is a perspective view illustrating example draper belt assemblies of the header of the harvester of FIG. 11 in an unflexed state.
Figure 19:
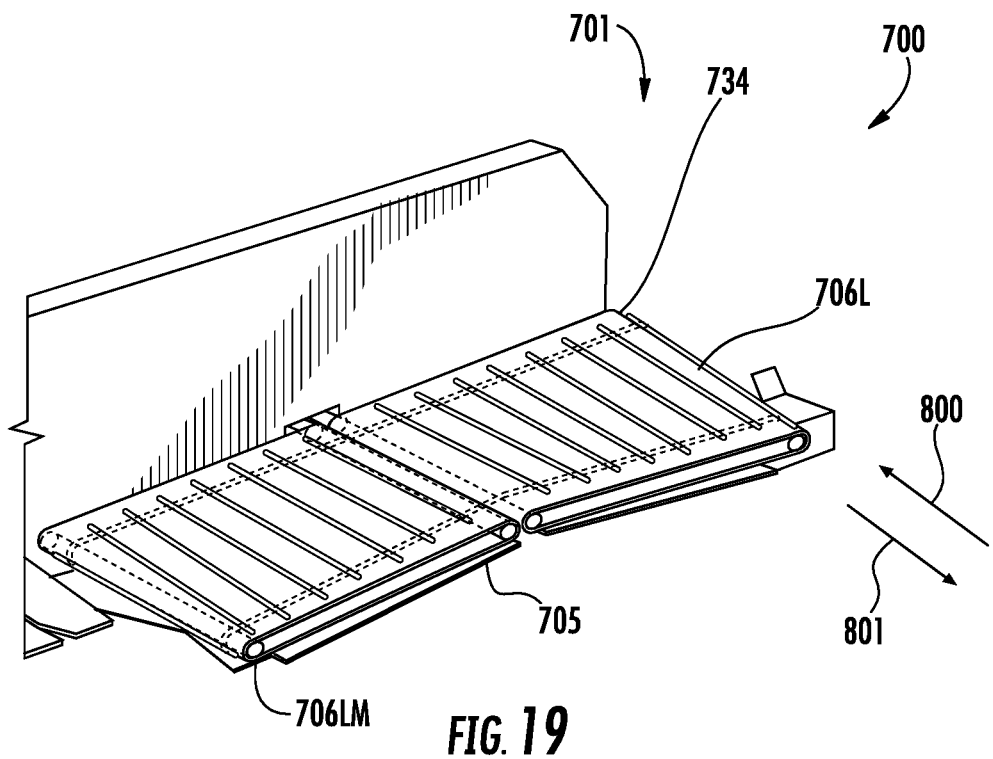
FIG. 19 is a perspective view illustrating the example draper belt assembly of FIG. 18 in a flexed state.

FIGS. 18 and 19 illustrate draper belt assemblies 706L and 706LM different flexed states. FIG. 18 illustrates draper belt assemblies 706L and 706LM in an unflexed state. FIG. 19 illustrates draper belt assemblies 706L and 706LM in a flexed state which results in axial loading upon draper belt assemblies 706L and 706LM. In FIG. 19, the upward deflection of the flexible draper belt assembly 706L and 706LM impose an axial load towards the rear of header 700 in the direction indicated by arrow 800.

FIGS. 20-27 are top views of a portion of draper belt assembly 706L, illustrating various stages of interaction between guides 750, 752 of draper belt 734 and roller 730. Guides 750, 752 of draper belt 734 undergo the same stages of interaction with respect to roller 732. Likewise, each of the draper belt assemblies of header 700 may also undergo the same stages of interaction with respect to their respective drive and idler rollers in response to flexing of the draper belt assemblies as shown in FIG. 19.

FIGS. 20 and 21 illustrate the relationship between belt guides 750 and 752 with respect to master groove 740 and slave groove 742 when draper belt assembly 706L is in an unflexed state, a state in which driven belt assembly 706L is not undergoing axial loading. As shown by FIGS. 20 and 21, each of belt guides 750, 752, when positioned within grooves 740 and 742, respectively, comprises a spanning portion 804 and a turning portion 806. Spanning portion 804 comprises that portion of each of guides 750, 752 that is presently extending in a substantially flat plane, spanning between the topsides of roller 730, 732 are between the bottom side of roller 730, 732.

Turning portion 806 comprises that portion of each of guides 750, 752 that is presently turning or wrapping about rollers 730 or roller 732. During such turning or wrapping, turning portion 806 undergoes forces so as to expand from the smaller with of spanning portion 804 to the larger or wider width of turning portion 806. As shown by FIG. 21, in the example illustrated, master groove 740 has a width such that turning portion 806 substantially or completely fills master groove 740 such that the exterior side surfaces 775 and 776 of turning portion 806 contact the interior side surfaces 763 and 764 of grooves 740, locking turning portion 806 with respect to roller 730. As shown by FIG. 20, due to the larger axial dimension of slave groove 742, exterior side surfaces 775 and 776 of turning portion 806 of belt guides 752 remain out of contact are spaced from interior side surfaces 765 and 766, respectively, of slave groove 742.

In the example illustrated, turning portions 806 have profiles or shapes that reduce the tendency of belt guide belt guides 750, 752 to ride up on such surfaces, in a direction out of their respective groove 750, 752, in response to axial loading. The exterior side surfaces 775, 776 of turning portions 806 extend in planes that are angularly spaced from plane 768 by an angle AG of no greater than 100 degrees. In one implementation, outer or exterior side surfaces 775, 776 extend in planes that are angularly spaced from plane 768 by an angle A of no greater than 95°. In the example illustrated, outer side surfaces 775, 776 extend in planes that are perpendicular to plane 768. In some implementations, outer side surfaces 775, 776 extend in planes respectively, that are angularly spaced from plane 768 by an acute angle A (less than 90°) such that guides 750, 752 each have an undercut to enhance retention and capture of the belt guides 750, 752 within their respective grooves 740, 742.

Because angles A and AG are no greater than 100°, axial loading is less likely to result in surfaces 775, 776 riding up on surfaces 763, 764 or surfaces 765 or 766, which might otherwise result in dislodgment of guide guides 750, 752 from grooves 740, 742 and misalignment of draper belt 734. As the angles A and AG decrease in value, the likelihood of surfaces 775, 776 of belt guides 750, 752 riding up on surfaces 763, 764 or surfaces 765 or 766 also decreases. The angle A of grooves 740, 742 (shown in FIG. 14) and the angle AG of guide 750, 752 facilitates enhanced retention of guide 750, 752 within grooves 740, 742 to better maintain 734 in a correctly aligned state with respect to rollers 730, 732 and with respect to the other components of header.

FIGS. 22-27 illustrate the relationship between belt guides 750 and 752 with respect to master groove 740 and slave groove 742 when draper belt assembly 706L is in a flexed state as shown in FIG. 19, a state in which driven belt assembly 706L is undergoing axial loading. FIGS. 22-27 illustrate various stages of interaction between such belt guides 750, 752 and their respective grooves 740, 742. FIGS. 22 and 23 illustrate the relationship between belt guides 750 and 752 with respect to master groove 740 and slave groove 742 during a first stage of axial loading, the initiation of flexing of assembly 706L at time T1.

As indicated by arrow 800, the flexing of draper belt assembly 706L imposes axial away from cutter assembly 705 and toward the rear of header 700. Such loading results in guides 750, 752 shifting rearwardly (to the left in FIGS. 22 and 23) from the position shown in broken lines to a position in which spanning portion 804 of belt guides 750 is deformed into contact with interior side surface 763 of master groove 740. Despite also being shifted to the left from the initial position shown in broken lines, neither spanning portion 804 nor turning portion 806 of belt guides 752 is shifted to an extent so as to come into contact with interior side surface 766 of slave groove 742.

FIGS. 24 and 25 illustrate the relationship between belt guides 750 and 752 with respect to master groove 740 and slave groove 742 during a second stage of axial loading, the flexing of assembly 706L at time T2. As shown by FIGS. 24 and 25, continued loading and flexing of draper belt assembly 706L results in guides 752 shifting further rearwardly (further to the left in FIGS. 24 and 25). As shown by FIG. 25, portions 804 and 806 of guide 750 remain in contact with interior side surface 763 of master groove 740. As shown by FIG. 24, turning portion 806 of belt guides 752 shifts such that exterior side surface 776 of turning portion 806 is in contact with interior side surface 766 of slave groove 742. In the example illustrated in FIGS. 24 and 25, spanning portion 804 of belt guides 752 remains out of contact with interior side surface 766 of slave groove 742.

FIGS. 26 and 27 illustrate the relationship between belt guides 750 and 752 with respect to master groove 740 and slave groove 742 during a third stage of axial loading, the flexing of assembly 706L at time T3. In some circumstances, driven belt assembly 706L may not flex to an extent so as to attain the third stage of axial loading. As shown by FIGS. 24 and 25, continued loading and flexing of draper belt assembly 706L results in guide 752 shifting further rearwardly (further to the left in FIGS. 26 and 27). As shown by FIG. 26, portions 804 and 806 of guide 750 remain in contact with interior side surface 763 of master groove 740. As shown by FIG. 26, exterior side surface 776 of turning portion 806 is in contact with interior side surface 766 of slave groove 742. Exterior sides of a 776 of spanning portion 804 is further deformed into abutting contact with interior side surface 766 of slave groove 742.

Although FIGS. 19-27 illustrate the multi-stage loading or interaction of guides 750, 752 with grooves 740, 742 in response to the upward deflection of the flexible draper belt assembly 706L and 706LM by an axial load towards the rear of header 700 in the direction indicated by arrow 800, such draper belt assemblies 706 LM and 706L may also provide multi-stage loading or interaction of guides 750, 752 with grooves 740, 742 in response to the upward deflection of the flexible draper belt assembly 706L and 706LM by an axial load towards the front of header 700 in the direction indicated by arrow 801. As shown by FIGS. 20 and 21, guides 750 in some 752, in the example illustrated, are largely centered within the respective grooves 740, 742 to provide such bidirectional multi-stage interaction. As described above, in some implementations, rather than slave groove 742 being located proximate to the rear of such draper belt assemblies with a master groove 740 being located proximate to the front of such belt assemblies (proximate to a cutting bar), slave groove 742 may be located proximate to the front of such draper belt assemblies while master groove 740 is located proximate to the rear of such belt assemblies.

Although draper head 700 is illustrated as having two draper belt assemblies on either side of the feeder house 709 (shown in FIG. 11) with the two outermost rollers as shown in FIG. 18 comprising idler rollers and the two innermost, adjacent rollers comprising drive rollers, in other implementations, the two center adjacent rollers may comprise idler rollers while the two outer most rollers comprise drive rollers. In some implementations, draper head 700 comprises a first single draper belt assembly extending from adjacent the central draper belt 707 (shown in FIG. 11) to the far right side of draper head 700 and a second single draper belt assembly extending from adjacent the central draper belt 707 to the far left side of draper head 700. In one such implementation, the innermost ends of the first and second single draper belt assemblies are supported by drive rollers while the outermost ends are supported by idler rollers. In yet other implementations, this relationship is reversed with the innermost ends of the first and second single draper belt assemblies being supported by idler rollers while the outermost ends are supported by drive rollers.

Although the present disclosure has been described with reference to example implementations, workers skilled in the art will recognize that changes may be made in form and detail without departing from the spirit and scope of the claimed subject matter. For example, although different example implementations may have been described as including one or more features providing one or more benefits, it is contemplated that the described features may be interchanged with one another or alternatively be combined with one another in the described example implementations or in other alternative implementations. Because the technology of the present disclosure is relatively complex, not all changes in the technology are foreseeable. The present disclosure described with reference to the example implementations and set forth in the following claims is manifestly intended to be as broad as possible. For example, unless specifically otherwise noted, the claims reciting a single particular element also encompass a plurality of such particular elements. The terms "first", "second", "third" and so on in the claims merely distinguish different elements and, unless otherwise stated, are not to be specifically associated with a particular order or particular numbering of elements in the disclosure.

What is claimed is:

1. A draper belt assembly for a harvester head, the draper belt assembly comprising:

a roller comprising:
- a first groove having a first interior side surface facing in, a first direction;
- a second groove having a second interior side surface facing in the first direction;

a draper belt comprising:
- a web;
- a first elastomeric belt guide extending from the web and received within the first groove, the first belt guide having a first exterior side surface facing in a second direction opposite, the first direction, the first exterior side surface being, axially spaced from the first interior side surface by first distance; and
- a second elastomeric belt guide extending from the web and received within the second groove, the second belt guide having a second exterior side surface facing in the second direction, the second exterior side surface being axially spaced from the second interior side surface by second distance greater than the first distance in absence of axial, loads to the draper belt.

2. The draper belt assembly of claim 1, wherein the second groove is wider than the first groove.

3. The draper belt assembly of claim 1, wherein the first groove has a third interior side surface facing in the second direction, wherein the first belt guide has a third exterior side surface facing in the first direction and wherein the first interior side surface and the third interior side surface concurrently abut the first exterior side surface and the third exterior side surface, respectively, while the second interior side surface is spaced from the second exterior side surface.

4. The draper belt assembly of claim 1, wherein the second distance is at least 3 mm greater than the first distance.

5. The draper belt assembly of claim 1, wherein the second exterior side surface extends at an angle of no greater than 100° from an underside of the web when the first belt guide is wrapping about the roller within the first groove.

6. The draper belt assembly of claim 5, wherein the first exterior side surface extends at an angle of no greater than 90° from an underside of the web when the first belt guide is wrapping about the roller within the first groove.

7. The draper belt assembly of claim 6, wherein first interior side surface extends at an angle of no greater than 95° relative to an outer surface of the first roller.

8. The draper belt assembly of claim 7, wherein the second exterior side surface extends at an angle of no greater than 95° from an underside of the web when the second belt guide is wrapping about the roller within the second groove.

9. The draper belt assembly of claim 8, wherein the second interior side surface extends at an angle of no greater than 95° relative to an outer surface of the second roller.

10. The draper belt assembly of claim 1. wherein first interior side surface extends at an angle of no greater than 95° relative to an outer surface of the first roller.

11. The draper belt assembly of claim 10, wherein the second interior side surface extends at an angle of no greater than 95° relative to an outer surface of the second roller.

12. The draper belt assembly of claim 1, wherein the first interior side surface extends at an acute angle with respect to and outer surface of the roller so as to form an undercut about the roller.

13. The draper belt assembly of claim 1, wherein the draper belt is an endless belt.

14. The draper belt assembly of claim 1, wherein the draper belt is a seamed belt.

15. The draper belt assembly of claim 1, wherein the head further comprises a cutter bar at a front of the head, wherein the first groove is proximate a rear of the head while the second groove is proximate the front of the head.

16. The draper belt assembly of claim 1, wherein the second groove has a fourth interior side surface facing in the second direction, wherein the second belt guide has a fourth exterior side surface facing in the first direction and spaced from the fourth interior side surface when the second belt guide is wrapping about the first roller within the second groove in absence of axial loads being applied to the draper belt.

17. A draper belt assembly comprising:
- a first roller having a first groove and a second groove;
- a second roller having a first groove having a first width and a second groove having a second width greater than the first width;
- a draper belt supported by the first roller and the second roller, the draper belt comprising:
  - a web;
  - a first elastomeric belt guide within the first groove of the second roller; and
  - a second elastomeric belt guide within the second groove of the second roller, the second belt guide having a belt guide width less than the second width of the second groove of the second roller.

18. The draper belt assembly of claim 17, wherein the first groove of the first roller has a third width and wherein the second groove has a fourth width greater than the third width and wherein the first belt guide has a belt guide width less than the second width of the fourth groove of the first roller.

19. A method comprising:
- guiding a draper belt extending about a roller with a first belt guide extending in a first groove of the roller and a second belt guide extending within a second groove of the roller; and
- sequentially contacting exterior sides of the first belt guide and the second belt guide with interior sides of the first groove and the second groove, respectively, in response to axial forces exerted upon the draper belt.

20. The method of claim 19 further comprising expanding, the first belt guide from out of contact into contact with opposite interior sides of the first groove as the first belt guide wraps about the roller.

* * * * *